UNITED STATES PATENT OFFICE.

RALPH D. MERSHON, OF NEW YORK, N. Y.

ART OF FORMING DIELECTRIC FILMS.

1,012,889.      Specification of Letters Patent.      Patented Dec. 26, 1911.

No Drawing.      Application filed January 5, 1910. Serial No. 536,442.

*To all whom it may concern:*

Be it known that I, RALPH D. MERSHON, a citizen of the United States, residing at New York, in the county and State of New York, have invented certain new and useful Improvements in the Art of Forming Dielectric Films, of which the following is a full, clear, and exact description.

As is well known, the action of electrolytic condensers, rectifiers, and similar devices depends upon the film which may be formed upon the surface of aluminum, tantalum, magnesium and other metals when immersed in certain electrolytes and subjected to the electric current; which film possesses the singular property of allowing current to flow from the electrolyte to the electrode with but little opposition, but of strongly opposing current tending to flow from the electrode to the electrolyte. To current tending to flow in the direction last indicated the film, although excessively thin, possesses high specific resistance and high dielectric strength, being able to withstand very considerable voltages without rupture, and with very inconsiderable leakage current. It has been found, however, that in order that the film shall evidence to an efficient degree the qualities of high specific resistance and high dielectric strength its temperature must not be much, if any, above a certain value; and that as the temperature approaches such value (about 40° C. in the case of the electrodes and electrolytes most commonly used) the film begins to lose these good qualities, the impairment of the behavior of the film above this critical temperature being very marked. In all the devices depending upon the existence of such a film for their action there is a certain amount of loss, the loss being in general greater with alternating than with direct current. The resulting heat must be got rid of by means of radiation or convection to the surrounding air, or by means of cooling coils in which water, oil or other medium is circulated, or by means of an air-blast, etc. But such transference of heat means that the heat-receiving medium must be at a lower temperature than the electrolyte, and inasmuch as the temperature of the air will often be near to and sometimes above that at which, as previously stated, the behavior of the film rapidly deteriorates in effectiveness, air cooling will not in general be satisfactory for the purpose, as a small temperature differential would require a very large area of cooling surface, and even this large surface would be ineffective on days when the atmospheric temperature is equal to or higher than the critical value. Cooling by means of water or oil circulation will at times be subject to like objections, though not to so great a degree. This sensitiveness of the film to heat has been one of the most serious difficulties encountered in the use of electrolytic apparatus of the kind mentioned, and to avoid or obviate the same has long been a desideratum in this art. I have therefore been led to considerable experimentation and study in this direction, and in the course of the same I have discovered that an important relation appears to exist between the sensitiveness of the film to heat and the temperature to which it is subjected in the course of its formation or preparation; namely, that, in general, the higher the temperature during formation or preparation of the film the higher will be the temperature which the film can afterward withstand without serious, if any, impairment of its essential properties. It is upon this discovery that the invention which forms the subject of my present application for Letters Patent is based.

Briefly stated, the invention consists in forming or preparing the films at a temperature above that at which they are afterward to operate.

The usual method of producing the films has been as follows: When the films are produced with alternating current at least two electrodes of equal area are used, both being of aluminum (or other suitable metal) and both immersed in a suitable electrolyte. One of these electrodes or plates is attached to one terminal of the alternating current circuit and the other plate is attached to the other terminal. Where direct current is to be used to form the films all the electrodes which are to be filmed are connected to the positive pole of the direct current source and to the other pole is connected a cathode-electrode, preferably of non-filming material, say of carbon, iron, lead, or other suitable material. In either case an E. M. F. of small value is impressed on the electrodes. The current thus caused to flow promptly begins to fall in value, at first rapidly and then less and less rapidly, always approaching a definite lower limit. In the case of direct current this limit approximates zero, or at any rate has a very low value. (With alternating current the limit is higher, partly because of the higher losses with alternating current but chiefly because of the charging or condenser-current component. In general it is better, when using alternating current, to depend upon the indications of a wattmeter rather than an ammeter, as wattmeter readings will not be masked by the large charging component.) If, after the current has ceased to fall rapidly, the E. M. F. be increased the current flowing will increase coincidently, again falling toward a limiting value. By increasing the voltage in this manner, that is, by relatively small steps, or by leaving at any step a constant voltage until the current has fallen to an approximately constant value in the case of alternating current, or to a very low value in the case of direct current, a film of maximum resistance and dielectric strength may be built up, capable of withstanding very considerable voltages, as before stated. There is, however, a certain maximum voltage, depending, as is well known, upon the kind of metal used in the filming electrodes and the chemical used in the electrolyte, at which the film breaks down and beyond which the forming process cannot be carried. It is of course clear that the forming voltage should not exceed this maximum value.

In practicing my present invention I prefer to proceed by the step-by-step method described above, the maximum forming voltage employed being preferably higher than the maximum voltage to which the plates or electrodes will be subjected in the condenser or other apparatus. The temperature of the plates is then raised, as by heating the electrolyte in any convenient manner, above the maximum temperature to which they will be subjected in the electrolytic apparatus for which they are designed. By preference the forming temperature is from fifty to a hundred per cent. above the maximum temperature of use. Thus, if a condenser, for example, is to operate at a temperature as high as 60° C., the forming temperature would be preferably from 90° to 120° C., thus affording ample margin between the operating temperature and the highest temperature at which the film is operative. The maximum forming voltage, too, may be considerably higher than the operating voltage, as before stated, but of course it should not reach the value at which the film breaks down. The time required to fully form the film depends largely upon the metal and the electrolyte, but it may be said that in general it is safe to stop when with the highest temperature and voltage employed in the formation the current from the filming electrode or electrodes to the electrolyte ceases to fall rapidly; or at any rate when the leakage current becomes approximately constant.

In practice it is found that films formed as described are practically independent of temperature conditions below a certain limit, of slightly less value than but determined by the value of the forming temperature, and hence may be effective at temperatures far in excess of any heretofore permissible. At the same time the films are more effective at lower temperatures and are considerably less sensitive to other deleterious agencies, than are films produced by any prior method with which I am familiar.

The temperature treatment may be effected by raising the temperature gradually, or by raising it step-by-step; and it may be done while the film is being developed, or afterward. In the latter case I prefer to keep current on the electrodes, with a voltage approximating, at any rate, the highest voltage used in developing the films. There are also some advantages in employing direct current in developing the films (and also in the temperature treatment step of the formation process), not only as regards the qualities of the film itself but also as regards ease and convenience of manipulation and of the measurements indicative of the progress of the process. For this reason in the following more detailed description of the preferred mode of performing the temperature treatment step, and the phenomena attending the same, direct current will be mainly dealt with, although what is said applies qualitatively to alternating current as well, and it should be borne in mind that alternating current can be used if desired. It is also assumed that the filming electrodes are of aluminum, but any other metal suitable for the purpose may be used.

When the film, developed at ordinary temperature, is subjected to the temperature treatment step of the formation process, the current flowing will increase and at or above a certain temperature (usually about 40° C., as before stated) the increase will be quite marked and will become more and more marked as the temperature rises, the rate of current increase being more rapid than the rate of temperature increase. But on holding the electrolyte at one of these higher temperatures the current eventually decreases, at first rapidly and then less and less rapidly, in a manner similar to that described in the case of increase voltage. That is, when the temperature is raised the current will increase, but if the temperature be then held stationary the current will fall, rapidly when the decrease first begins and then less and less rapidly, approaching for each temperature a limiting value. If in the course of the temperature treatment the temperature be held at the highest value considered necessary or advisable under the circumstances a condition of affairs will be reached in which the current is falling very slowly and has apparently closely attained its limiting value for the voltage and temperature to which the film is being subjected. The temperature treatment may now be discontinued, and it will then be found that the film will be efficiently operative in a condenser, rectifier, or other apparatus, at any temperature up to the limit before mentioned.

While the temperature treatment is effective when performed with the electrolytes heretofore used it is more effective if the electrolyte employed in the treatment be acidulated, as by the addition of a small quantity of a suitable acid or acids for example, an electrolyte consisting of a solution of borax can be acidulated with boric acid. In general, if A, B, C, D, etc., represent salts which can be used to form the films, a solution of any one or more of these salts may be acidulated by any one or more of the acids of salts A, B, C, D, etc. Thus with a borax electrolyte phosphoric acid may be used instead of or along with boric acid, and with a phosphate electrolyte boric acid may be employed instead of or with phosphoric acid, etc.

In using direct current in the forming process the cathode may be either of filming or non-filming material, and the use of the latter is assumed in the foregoing description. With a cathode of filming material the cathode will be attacked little if any if the electrolyte used is acidulated but will be more strongly attacked if the electrolyte be unacidulated. In the latter case the performance of the condenser electrodes so filmed will be somewhat better if they are operated in the identical electrolyte or in any acidulated electrolyte. It therefore appears that when the films are formed in an unacidulated electrolyte, with a cathode of filming material, the temperature treatment effects a change in the composition of the electrolyte as well as in the nature of the films themselves. For example, if with direct current and an unacidulated electrolyte the cathode, instead of being of non-filming material, be made of metal capable of forming a film in the electrolyte used, say the metal comprising the electrodes which are to be filmed, the cathode is attacked and there is thrown down in the electrolyte a quantity of material more or less insoluble. The bulk of this material in the case of aluminum electrodes consists of aluminum hydrate, and some iron hydrate is found mixed with it, presumably from impurities in the aluminum. There also appear to be small quantities of a compound, possibly an aluminate, formed between the aluminum and the base of the electrolyte, and also small quantities of the acid (free) of the electrolyte. Just what the change is in the electrolyte which causes it to be effective in the same way as though it had been acidulated is not clear, unless it be due to the free acid or the aluminate just mentioned, or both. But it appears to be due to something in the precipitate going to the bottom of the electrolyte when cold, for although plates having films formed in the way mentioned, that is, with direct current and a cathode of filming material in an unacidulated electrolyte, are not so effective in a fresh solution, like that in which the film-formation was begun they are just as effective in such fresh solution if there be added to it the precipitate in question; nor are they so effective in the solution obtained by decanting off the top portion of the electrolyte in which the precipitate has been formed and has settled to the bottom.

I claim:

1. The improvement in the art of forming dielectric films on electrodes for use in electrolytic apparatus of the kind described, which consists in forming the films at a temperature in excess of that to which they are to be subjected in the said electrolytic apparatus.

2. The improvement in the art of forming dielectric films on electrodes for use in electrolytic apparatus of the kind described, which consists in immersing the filmed electrodes in a suitable electrolyte and subjecting the same to heat at a temperature in excess of that to which they are to be subjected in said electrolytic apparatus.

3. The improvement in the art of forming dielectric films on electrodes for use in electrolytic apparatus of the kind described, which consists in subjecting the films to a temperature from 50 to 100 per cent. higher than the temperature at which the said electrolytic apparatus is to operate.

4. The improvement in the art of forming dielectric films on electrodes for use in electrolytic apparatus of the kind described, which consists in forming the films at a temperature and voltage in excess of the temperature and voltage at which the said electrolytic apparatus is to operate.

5. The improvement in the art of forming dielectric films on electrodes for use in electrolytic apparatus of the kind described, which consists in immersing the electrodes in a suitable electrolyte, impressing current on the electrodes, raising the temperature to a point higher than that at which the said electrolytic apparatus is to operate, and maintaining such temperature until the leakage current has fallen to a suitable value.

6. The improvement in the art of forming dielectric films on electrodes for use in electrolytic apparatus of the kind described, which consists in immersing the electrodes in a suitable electrolyte, impressing current on the electrodes, raising the voltage of the current by successive steps to a point in excess of that at which the said electrolytic apparatus is to operate, and raising the temperature to a point in excess of that to which the said apparatus is to be subjected.

7. The improvement in the art of forming dielectric films on electrodes for use in electrolytic apparatus of the kind described, which consists in forming the films with a voltage and temperature gradually increasing to values in excess of those at which the said electrolytic apparatus is to operate.

8. The improvement in the art of forming dielectric films on electrodes for use in electrolytic apparatus of the kind described, which consists in immersing the electrode in a suitable electrolyte at or below the temperature to which the said electrolytic apparatus is to be subjected, impressing current on the electrodes, and gradually raising the temperature to a point in excess of that to which the electrodes are to be used in said apparatus.

9. The improvement in the art of forming dielectric films on electrodes for use in electrolytic apparatus of the kind described, which consists in immersing the electrodes in a suitable electrolyte, impressing current on the electrodes and developing films thereon, and raising the temperature to a point in excess of that at which the electrodes are to be used in said apparatus.

10. The improvement in the art of forming dielectric films on electrodes for use in electrolytic apparatus of the kind described, which consists in forming the films with direct current and at a temperature in excess of that to which they are to be subjected in the said electrolytic apparatus.

11. The improvement in the art of forming dielectric films on electrodes for use in electrolytic apparatus of the kind described, which consists in forming the films at a temperature and with a direct current voltage in excess of the temperature and voltage at which the said electrolytic apparatus is operated.

12. The improvement in the art of forming dielectric films on electrodes for use in electrolytic apparatus of the kind described, which consists in forming the films in an acid electrolyte at a temperature in excess of that to which they are to be subjected in the said electrolytic apparatus.

13. The improvement in the art of forming dielectric films on electrodes for use in electrolytic apparatus of the kind described, which consists in forming the films in an acid electrolyte with direct current and at a temperature in excess of that to which they are to be subjected in the said electrolytic apparatus.

14. The improvement in the art of forming dielectric films on electrodes for use in electrolytic apparatus of the kind described, which consists in immersing the electrodes in a suitable electrolyte, impressing direct current upon the electrodes and developing films thereon, and raising the temperature to a point in excess of that at which the electrodes are to be used in said apparatus.

15. The improvement in the art of forming dielectric films on electrodes for use in electrolytic apparatus of the kind described, which consists in immersing the electrodes in a suitable electrolyte, subjecting the electrodes to increasing direct current voltage to develop films on the electrodes, and raising the temperture to a point in excess of that at which the electrodes are to be used in said apparatus.

16. The improvement in the art of forming dielectric films on electrodes for use in electrolytic apparatus of the kind described, which consists in immersing the filmed electrodes in an electrolyte, impressing current on the electrodes, raising the temperature of the electrolyte and maintaining the temperature until the leakage current has fallen to a low value, and repeating such temperature-raising step.

In testimony whereof I affix my signature in the presence of two subscribing witnesses.

RALPH D. MERSHON.

Witnesses:
S. S. DUNHAM,
M. LAWSON DYER.